(12) United States Patent
Malani et al.

(10) Patent No.: US 11,087,059 B2
(45) Date of Patent: Aug. 10, 2021

(54) CLOCK DOMAIN CROSSING VERIFICATION OF INTEGRATED CIRCUIT DESIGN USING PARAMETER INFERENCE

(71) Applicant: Synopsys, Inc., Mountain View, CA (US)

(72) Inventors: Anshu Malani, Uttar Pradesh (IN); Paras Mal Jain, Mountain View, CA (US); Sudeep Mondal, Uttar Pradesh (IN)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 16/906,001

(22) Filed: Jun. 19, 2020

(65) Prior Publication Data
US 2020/0401749 A1 Dec. 24, 2020

(30) Foreign Application Priority Data
Jun. 22, 2019 (IN) .............................. 201911024869

(51) Int. Cl.
*G06F 30/33* (2020.01)
*G06F 30/327* (2020.01)
*G06F 119/12* (2020.01)

(52) U.S. Cl.
CPC ............ *G06F 30/33* (2020.01); *G06F 30/327* (2020.01); *G06F 2119/12* (2020.01)

(58) Field of Classification Search
CPC .... G06F 2119/12; G06F 30/327; G06F 30/33; G06F 2115/02; G06F 30/3308; G06F 30/3323
See application file for complete search history.

(56) References Cited

U.S. PATENT DOCUMENTS

| | | | | |
|---|---|---|---|---|
| 5,168,455 A | * | 12/1992 | Hooper ............... | G06F 30/3312 716/108 |
| 5,581,738 A | * | 12/1996 | Dombrowski .......... | G06F 30/33 716/104 |
| 5,953,519 A | * | 9/1999 | Fura ........................ | G06F 30/33 716/104 |
| 5,978,571 A | * | 11/1999 | Grundmann ............ | G06F 30/33 703/23 |

(Continued)

OTHER PUBLICATIONS

Cummings, C.E., "Clock Domain Crossing (CDC) Design & Verification Techniques Using System Verilog," Sunburst Design World Class Verilog & SystemVerilog Training (2008) SNUG, Boston, pp. 1-56. (Year: 2008).*

*Primary Examiner* — Helen Rossoshek
(74) *Attorney, Agent, or Firm* — Patterson + Sheridan, LLP

(57) ABSTRACT

Techniques for verification of integrated circuit design are disclosed. A design relating to an integrated circuit is received (102). The design includes a first parameterized element and a second parameterized element (104). The first parameterized element is identified as a do-not-care (DNC) element based on usage of the first parameterized element in the design (106). A plurality of models relating to the design are generated by a processing device (110). A first value of the first parameterized element is not varied during the generating, based on the identification of the first parameterized element as a DNC element (108). A second value of the second parameterized element is varied during the generating (108).

19 Claims, 4 Drawing Sheets

(56) References Cited

U.S. PATENT DOCUMENTS

| | | | | |
|---|---|---|---|---|
| 6,536,024 | B1* | 3/2003 | Hathaway | G06F 1/10 327/295 |
| 7,137,078 | B2* | 11/2006 | Singhal | G06F 30/33 716/102 |
| 7,219,048 | B1* | 5/2007 | Xu | G06F 30/3312 703/19 |
| 7,437,701 | B1* | 10/2008 | Dutra | G06F 30/33 716/104 |
| 7,814,444 | B2* | 10/2010 | Wohl | H03M 7/30 716/100 |
| 8,037,437 | B2* | 10/2011 | Davis | G06F 30/35 716/113 |
| 8,271,918 | B2* | 9/2012 | Kwok | G06F 30/3323 716/108 |
| 8,327,307 | B2* | 12/2012 | Kronke | H04L 7/02 716/134 |
| 8,397,188 | B1* | 3/2013 | Scheldt | G06F 30/33 716/106 |
| 8,572,539 | B2* | 10/2013 | Cortadella | H03K 19/20 716/118 |
| 8,607,173 | B2* | 12/2013 | Sarwary | G06F 30/33 716/106 |
| 8,627,249 | B1* | 1/2014 | Pandey | G06F 30/30 716/108 |
| 8,661,384 | B2* | 2/2014 | Iwashita | G06F 30/33 716/108 |
| 8,739,088 | B1* | 5/2014 | Ou | G06F 30/30 716/106 |
| 8,856,706 | B2* | 10/2014 | Mneimneh | G06F 30/30 716/111 |
| 8,914,761 | B2* | 12/2014 | Ly | G06F 30/3312 716/113 |
| 9,432,298 | B1* | 8/2016 | Smith | H04L 49/9057 |
| 9,547,732 | B2* | 1/2017 | Drasny | G06F 30/33 |
| 10,366,186 | B2* | 7/2019 | Mautner | G06F 30/3312 |
| 2002/0188922 | A1* | 12/2002 | Ginneken | G06F 30/30 716/102 |
| 2005/0268258 | A1* | 12/2005 | Decker | G06F 30/33 716/104 |
| 2017/0116354 | A1* | 4/2017 | Chuang | G06F 30/33 |
| 2017/0337313 | A1* | 11/2017 | Abdul | G06F 30/30 |
| 2018/0075178 | A1* | 3/2018 | Drasny | G06F 30/3312 |
| 2018/0082003 | A1* | 3/2018 | Drasny | G06F 30/3312 |

* cited by examiner

CLOCK DOMAIN CROSSING VERIFICATION OF INTEGRATED CIRCUIT DESIGN USING PARAMETER INFERENCE

CROSS-REFERENCE TO RELATED APPLICATIONS

This application claims priority to and the benefit of Indian Patent Application No. IN201911024869, filed Jun. 22, 2019, which is incorporated by reference in its entirety.

TECHNICAL FIELD

Embodiments presented in this disclosure generally relate to electronic design automation. More specifically, one or more embodiments disclosed herein relate to verification of integrated circuit design using parameter inference for hierarchical abstraction flow.

BACKGROUND

As design size and complexity of electronic circuits increases, design verification becomes more and more difficult. A typical system-on-chip (SoC) contains multiple blocks assigned to multiple teams of engineers. This can present challenges in verifying the SoC, especially relating to capacity and debug, because a block owner (e.g., an engineer or team of engineers) may not be able to analyze violations relating to blocks that are assigned to another owner.

Hierarchical flow techniques can be used to address these challenges. A block owner can generate a hierarchical abstract model to use in representing blocks in a top level simulation (e.g., SoC level). An abstract model can be generated by using a suitable tool.

SUMMARY

Embodiments include a method. The method includes receiving a design relating to an integrated circuit. The design includes a first parameterized element and a second parameterized element. The method further includes identifying the first parameterized element as a do-not-care (DNC) element based on usage of the first parameterized element in the design. The method further includes generating, by a processing device, a plurality of models relating to the design. A first value of the first parameterized element is not varied during the generating, based on the identification of the first parameterized element as a DNC element. A second value of the second parameterized element is varied during the generating.

Embodiments further include a system including a processor and a memory storing instructions, which when executed by the processor, cause the processor to perform operations. The operations include receiving a design relating to an integrated circuit. The design includes a plurality of parameterized elements. The operations further include identifying a first parameterized element, of the plurality of parameterized elements, as a DNC element based on usage of the first parameterized element in the design and clock domain information relating to the first parameterized element. The operations further include generating one or more models relating to the design. A first value of the first parameterized element is not varied during the generating based on the identification of the first parameterized element as a DNC element.

Embodiments further include a non-transitory computer readable medium including stored instructions, which when executed by a processor, cause the processor to receive a design relating to an integrated circuit. The design includes a first parameterized element and a second parameterized element. The instructions further cause the processor to identify the first parameterized element as a DNC element, based on usage of the first parameterized element in the design and clock domain information relating to the first parameterized element. The instructions further cause the processor to identify the second parameterized element as not a DNC element based on usage of the second parameterized element in the design. The instructions further cause the processor to generate a plurality of models relating to the design. A first value of the first parameterized element is not varied during the generating based on the identification of the first parameterized element as a DNC element. A second value of the second parameterized element is varied during the generating based on the identification of the second parameterized element as not a DNC element.

BRIEF DESCRIPTION OF THE DRAWINGS

The disclosure will be understood more fully from the detailed description given below and from the accompanying figures of examples described herein. The figures are used to provide knowledge and understanding of examples described herein and do not limit the scope of the disclosure to these specific examples. Furthermore, the figures are not necessarily drawn to scale.

To facilitate understanding, identical reference numerals have been used, where possible, to designate identical elements that are common to the figures. It is contemplated that elements disclosed in one embodiment may be beneficially used in other embodiments without specific recitation.

DETAILED DESCRIPTION

Figure 1:
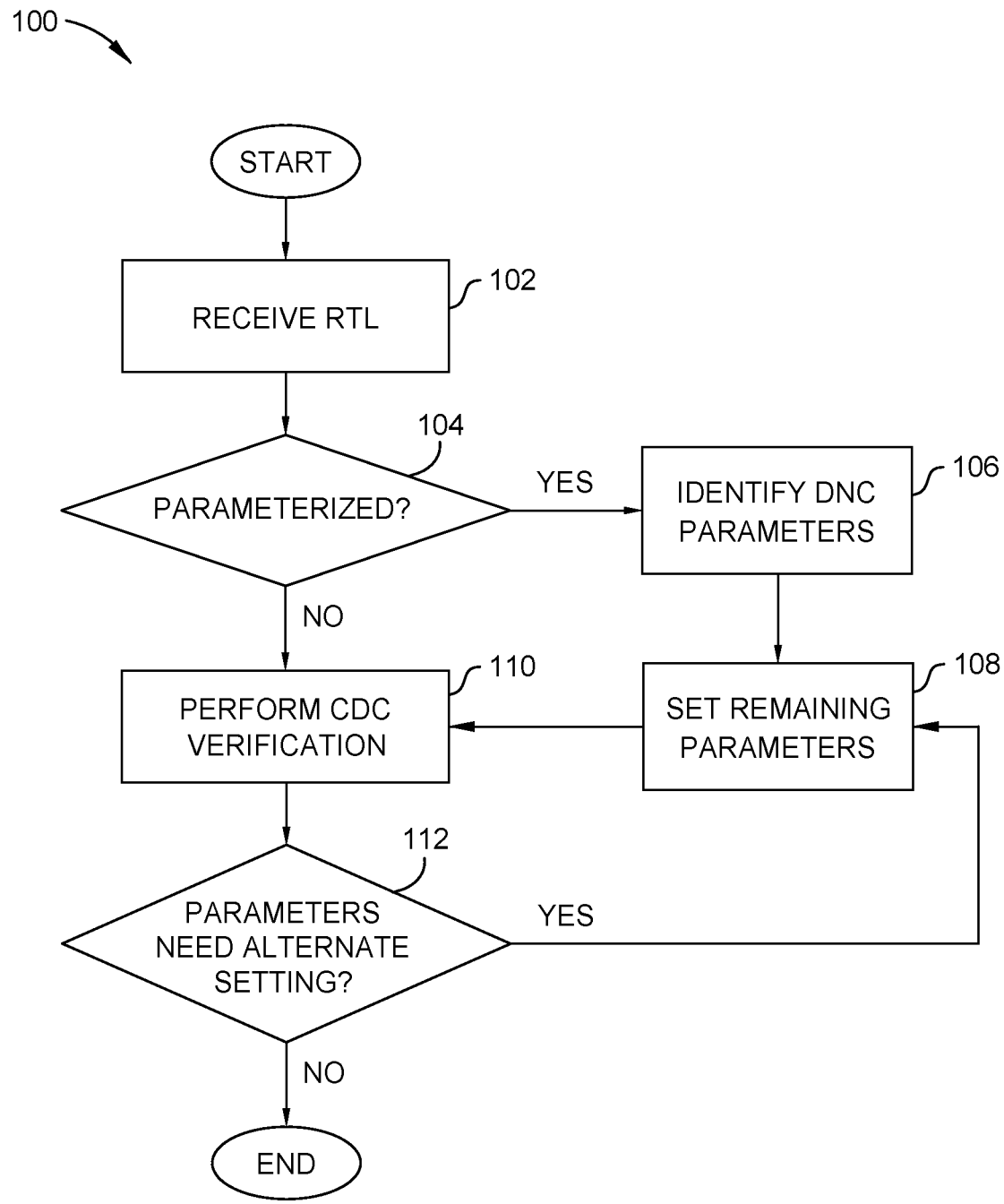
FIG. 1 is a flowchart for parameterized clock domain crossing (CDC) verification as part of electronic design of an integrated circuit, according to an embodiment.

Modern system-on-chip (SoC) designs typically include multiple different clock domains with signals transferring from one clock domain to another domain. Conventional register transfer level (RTL) verification techniques may not detect resynchronization problems, and other issues, relating to signals crossing clock domains. Clock-domain crossing (CDC) verification can use abstract models to identify design errors across clock domains. For example, a CDC verification process can replace CDC verified modules with an abstract model of the modules, with constraints defined on the boundaries of the module. For each block of the SoC, a block-level CDC verification is run. During this step, an abstract model of the block is generated. The abstract model annotates the relevant CDC information for the block.

In an embodiment the abstract model includes clock domain information for the ports (e.g., the boundaries) of the block, along with additional metadata. For example, the abstract model can identify whether an output port is an output of a synchronizer, whether an output port static, whether a path between the output port and input port(s) is purely combinational, etc. These are merely examples, and any suitable metadata can be used. In an embodiment, the abstract model includes the information required to encapsulate the behavior of the design, so that the abstract model can be used in place of the original design for verification.

In an embodiment, this CDC verification using abstract models of blocks can be done in a hierarchical manner from bottom upwards. As lower level blocks have been abstracted for CDC purposes, a higher level block that may include one of more abstracted CDC blocks is also verified and CDC abstracted. This process continues until the upper level block is CDC verified. Verifying bottom up, in this manner, can allow for faster verification of modules higher in the hierarchy, as at least portions thereof are replaced with the abstracted modules. This is merely one example, however, and other techniques (e.g., top-down verification) can also be used.

Many SoC designs further includes various RTL parameters used in design verification. Conventional CDC verification techniques can require generating an abstract hierarchical flow model for each combination of parameter values, requiring multiple simulations. As one example, a design can include five RTL parameters, each of which can have two possible values. CDC verification must generate 32 ($2^5$) abstract models to cover all possible combinations of parameter values. This large number of individual runs can be both time consuming and costly. Further, many designs have parameters which can have more than two possible values, resulting in an exponential increase of the number of models generated, as the number of parameters increases. This can be even more time consuming and even more costly.

Techniques disclosed herein relate to identifying parameters that do not impact CDC verification, and so do not need to be varied and set to multiple values to generate multiple abstract models. These parameters are referred to as do-not-care (DNC) parameters. As one example, a parameter which is being used for debug purposes only can be identified as DNC parameter, and need not be varied across different abstract models. In an embodiment, identifying DNC parameters up front, prior to CDC verification, can avoid generating multiple abstract models with varying values for these parameters.

Returning to the above-referenced example of five parameters with two possible values for each parameter, if three parameters can be identified as DNC, then CDC verification can generate an abstract model 4 times ($2^2$), instead of 32 times ($2^5$). Further, where parameters can have more than two values, the number of abstract models that do not need to be generated would be even greater.

Advantages of the present disclosure include, but are not limited to, reduction in the use of compute resources, and reduction in design verification time, for CDC verification. For example, by identifying DNC parameters fewer abstract models are generated during CDC verification. Generating abstract models for CDC verification can be computationally expensive, and so generating fewer abstract models reduces the use of compute resources. Generating abstract models for CDC verification can also take a long time, and so generating fewer abstract models can reduce the time used for CDC verification and reduce the turn-around time for design verification.

FIG. 1 is a flowchart 100 for parameterized clock domain crossing (CDC) verification as part of electronic design of an integrated circuit, according to an embodiment. At block 102, a CDC verification service (e.g., included in the instructions 526 illustrated in FIG. 5) receives RTL modeling an integrated circuit (e.g., a SoC). Any suitable hardware description language can be used for the RTL description. Further, RTL is merely an example, and any suitable design abstraction can be used.

At block 104, the CDC verification service determines whether the RTL is parameterized (e.g., whether it includes parameters). As discussed above, some integrated circuits include RTL parameters that are used to generate multiple abstract models for verification. For example, as discussed further below, parameters can be used in simulation constructs (e.g., for gate delays and timing checks), in denoting signal width, as an index of a continuous assignment (e.g., as a bus index), in a width cast (e.g., to truncate a bus to a given width), in an if, for, or generate statement (e.g., to define conditional design logic), in a selective assignment or comparison (e.g., to conditionally select design features), in a multi-concat multiplier (e.g., for concatenation repetitions), in an index, part select, or slice size (e.g., to define the value assigned to a signal), or in the right-hand-side of an init expression (e.g., to define init state). These are each described in further detail below. These are merely examples, and parameters can be used in numerous ways.

In an embodiment, the CDC verification service analyzes the RTL and identifies whether the RTL includes any parameters. If so, the RTL is parameterized, and the flow proceeds to block 106. Alternatively, or in addition, an engineer or system administrator could identify whether the RTL is parameterized. In an embodiment, RTL that includes any parameters is considered parameterized. Alternatively, RTL that includes a threshold number of parameters (e.g., above a pre-defined threshold) is considered parameterized.

At block 106, the CDC verification service identifies DNC (i.e., do-not-care) parameters among the RTL parameters. In an embodiment, some RTL parameters do not impact CDC abstract model generation. For example, debug parameters (e.g., relating to simulation constructs) do not impact CDC abstract model generation. As another example, parameters denoting signal width may, or may not, impact CDC abstract model generation, depending on the details of the parameters (e.g., depending on clock domain information relating to the parameters, as discussed further with regard to FIG. 3). The CDC verification service can analyze the parameters and identify DNC parameters. In an embodiment, identifying DNC parameters can be done automatically (e.g., using the CDC verification service to analyze the RTL and clock domain information). Alternatively, this could be done by a system administrator. Identifying DNC parameters discussed in more detail with regard to FIG. 2, below.

At block 108, the CDC verification service sets the remaining parameters. As discussed above, performing CDC verification for a parameterized design typically requires generating multiple abstract models (e.g., one for each possible combination of parameters) to ensure that clock domain information is accurately verified for the possible combinations of parameters. For example, each abstract model can correspond with a particular combination of parameter values, and a different model can be generated for each possible combination of parameter values. Some parameters may be marked as DNC, because such parameters do not impact generation of the CDC abstract model and so do not need to be varied across abstract models. Other parameters are not-DNC, and do impact generation of the CDC abstract model, and so should be varied across generated abstract models.

At block 108, the CDC verification service sets the values for these non-DNC parameters. In an embodiment, the CDC verification selects the next appropriate value for each non-DNC parameter (e.g., the next allowed value that has not yet been used to generate an abstract model). The values for the parameters can be set using any suitable tool (e.g., Synopsys Spyglass®), as is known in the art for CDC verification. The DNC parameters (e.g., identified at block 106) are not set to particular values.

At block 110, the CDC verification service performs CDC verification (e.g., generating the abstract model). If the RTL is parameterized (e.g., as determined at block 104), the CDC verification service performs CDC verification using the parameters (e.g., as set at block 108). If the RTL is not parameterized, the CDC verification service performs CDC verification without setting parameters.

For example, as described above the CDC verification service can perform bottom-up hierarchical CDC verification. The CDC verification service can run a block-level CDC verification for each block, and generate an abstract model that defines constraints on the boundaries of the module (e.g., for the ports of the block). As lower level blocks are abstracted for CDC purposes, a higher level block that may include one of more abstracted CDC blocks is also verified and CDC abstracted. This process continues until the upper level block is CDC verified. The hierarchical model is used for CDC verification, to identify clock domain crossing errors (e.g., across blocks).

In an embodiment, if the RTL is parameterized, the CDC verification service uses a permissible value for each parameter to generate an abstract model, and then repeats the generating as necessary with different permissible values for each parameter. DNC parameters do not need to be varied, and so do not require generating multiple abstract models (e.g., unlike non-DNC parameters which should be varied so that each permissible value is used, for each parameter, in at least one abstract model).

At block 112, the CDC verification service determines whether any parameters need an alternative setting. If so, the flow returns to block 108 and the CDC verification service sets the parameters to the next appropriate value(s) and generates additional abstract models. If not, the flow ends. In an embodiment, as discussed above, CDC verification can be used to identify design errors across clock domains.

Figure 2:
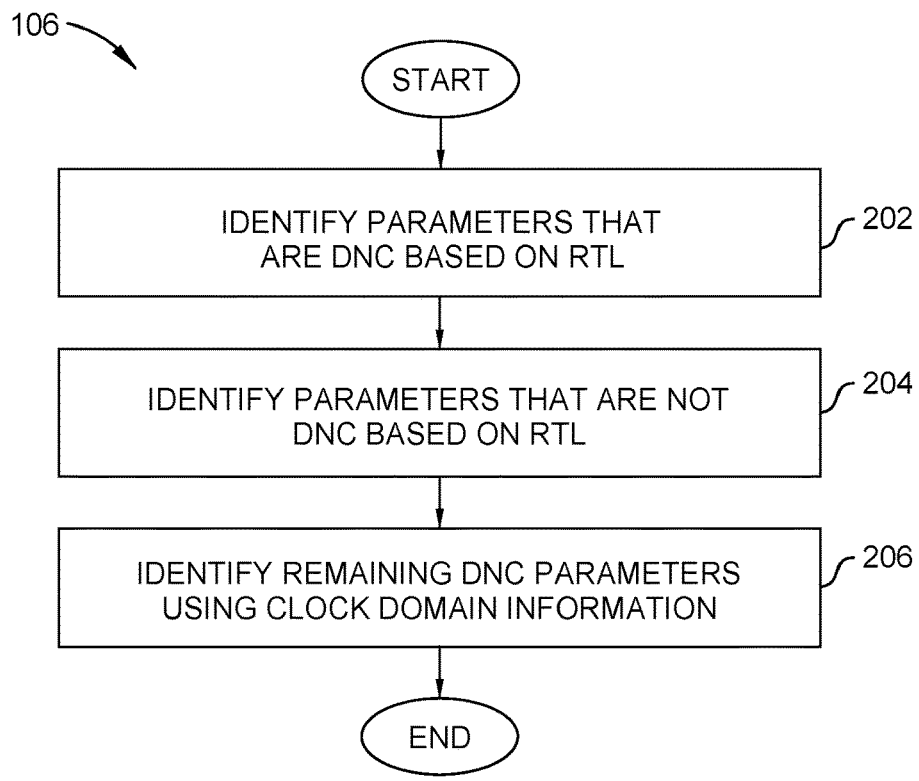
FIG. 2 is a flowchart for identifying do-not-care (DNC) parameters for CDC verification as part of electronic design of an integrated circuit, according to an embodiment.

FIG. 2 is a flowchart for identifying DNC parameters for CDC verification as part of electronic design of an integrated circuit, according to an embodiment. In an embodiment, FIG. 2 corresponds with block 106 illustrated in FIG. 1. At block 202, a CDC verification service (e.g., included in the instructions 526 illustrated in FIG. 5) identifies parameters that are DNC based on the RTL. In an embodiment, some parameters can be identified as DNC based on analyzing the RTL itself (e.g., without considering clock domains, as described below with regard to block 206 and FIG. 3).

For example, parameters used in gate delays, timing checks, and init expressions can be identified as DNC. These parameters are for simulation purposes and will not impact synthesis. For example, the parameter "DELAY" in the expression below can be identified as DNC:
module top (input a, b, output out);
parameter DELAY=2;
assign out=#DELAY a^b;

As illustrated, DELAY is a parameter that will not impact synthesis and will not impact the flattened netlist. Therefore, the DELAY parameter can be treated as DNC. Further, if a parameter is used in gate delay or in hash delay, it can be identified as DNC. In an embodiment, the usage of parameters in the RTL can be identified by a suitable analysis tool (e.g., Synopsys Spyglass®). Alternatively, an engineer or system administrator can identify the usage of parameters in the RTL.

At block 204, the CDC verification service identifies parameters that are not DNC, based on the RTL. In an embodiment, some parameters can be identified as not DNC based on analyzing the RTL itself (e.g., without considering clock domains, as described below with regard to block 206 and FIG. 3).

For example, in one embodiment, parameters used in if statements, for statements, or generate statements should not be DNC. These parameters can effectively change the synthesis and design logic. For example, an "if" statement can change the design logic. As another example, a chain of flops could get introduced or created using an if statement, for statement, or generate statement, thus effectively changing the design intent. This would mean that there may be no commonality between generated abstract models for the different parameter settings. Hence, this category of parameter should not be treated as DNC.

As another example, parameters used in selective assignment or comparison should not be treated as DNC. These parameters can lead to different abstract models for different parameter settings and can impact design intent. For example, in the RTL example illustrated below, the "mode" parameter should not be treated as DNC because it can result in different abstract models depending on its value:
if (mode==2)
  out=a+1;
else if (mode==3)
  out=a;

As another example, parameters used in a multi-concat multiplier should not be treated as DNC. For example, in the RTL example below, the parameter "MULT" can impact generation of the CDC abstract model and should not be DNC:
reg [3:0]r=4'b0111; //0x7
parameter MULT=4'b0010;
multi-concat multiples. MULT{r}//0x77//

In an embodiment, this can be identified based on the usage of parameters, as identified by a suitable analysis tool (e.g., Synopsys Spyglass®).

As another example, parameters used in index/part select/slice size should not be marked as DNC, because changing the parameter value can potentially change the bus bit it takes its value from, hence changing the synthesis. For example, in the RTL illustrated below the parameter "BIT" should not be marked as DNC because the signal "out" can change with different values of the parameter:
assign out=sync[BIT];

As illustrated, the signal "out" can get assigned sync[0] or sync[7] depending on the value of BIT and this can potentially change the design intent. Hence, this usage should not be treated as DNC As another example, parameters used in the right hand side (RHS) of an init expression should not be treated as DNC. Changing these parameter values can potentially change the init state, which in turn will impact the synthesized netlist. For example, as illustrated in the RTL below, the parameter "INIT" should not be marked as DNC:

```
always @(posedge clk or posedge rst)
   if (rst)
      q<=INIT;
   else
      q<=d;
```

In this illustrated example, if INIT is 0, then a flop with CLR pin will be created (because the init state is 0) and if INIT is 1, a flop with PRESET pin will be created (since init state is 1). This can potentially change the behavior of the CDC analysis and hence cannot be treated as DNC.

At block 206, the CDC verification service identifies remaining DNC parameters using clock domain information. In an embodiment, some categories of parameters can be marked as DNC if the parameter is used uniformly in one clock domain. For example, a given parameter may be marked as DNC if all bits of the parameter are used in the same clock domain, because this means the parameter will not impact CDC analysis. If different bits of the parameter are used across different clock domains, the parameter should not be marked as DNC because the parameter could impact CDC analysis. This is discussed further with regard to FIG. 3.

Figure 3:
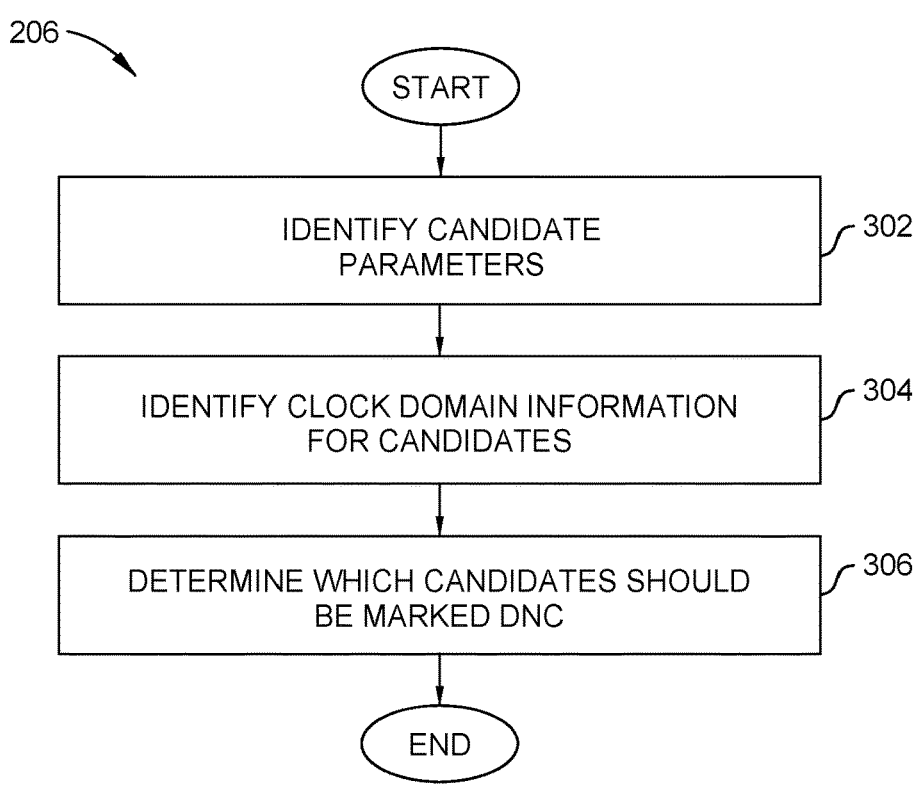
FIG. 3 is a flowchart for identifying DNC parameters across clock domains, for CDC verification as part of electronic design of an integrated circuit, according to an embodiment.

FIG. 3 is a flowchart for identifying DNC parameters across clock domains, for CDC verification as part of electronic design of an integrated circuit, according to an embodiment. In an embodiment, FIG. 3 corresponds to block 206 in FIG. 2, above. At block 302, a CDC verification service (e.g., included in the instructions 226 illustrated in FIG. 2) identifies candidate parameters. For example, the CDC verification service can analyze the RTL description for the integrated circuit undergoing analysis (e.g., a SoC). As discussed further below with regard to block 306, numerous categories of parameters can be identified as DNC candidates, and clock domain information can be used to determine whether to mark the candidate parameters as DNC. Any suitable hardware description language can be used for the RTL description. Further, RTL is merely one example, and any suitable design abstraction can be used.

At block 304, the CDC verification service identifies clock domain information relating to the candidate parameters. For example, the CDC verification service can identify whether each of the candidate parameters is used uniformly in one clock domain (e.g., all bits of the parameter are used in one clock domain).

At block 306, the CDC verification service determines which, if any, candidate parameters should be marked as DNC. In an embodiment, several different categories of parameters can be identified as DNC candidates. These categories of parameters can be identified as DNC candidates because they may, or may not, qualify as DNC parameters depending on other characteristics of the design. For example, the parameters identified at block 202 in FIG. 2 can be identified as always DNC based on the RTL relating to where the parameter is used, and the parameters identified at block 204 in FIG. 2 can be identified as always not-DNC based on the RTL relating to where the parameter is used. The CDC verification service performs further analysis to determine whether the candidate parameters qualify as DNC.

As one example, parameters used in denoting width can be identified as DNC candidates. That is, these parameters may, or may not, qualify as DNC depending on other characteristics of the design. If the relevant signal, for which a parameter is used to denote width, is internal (i.e., non-port), then the parameter can be marked as DNC. This is because, in an embodiment, the abstract model defines constraints on the boundaries of the module (e.g., for the ports of the block), and not on internal signals. The abstract model for an internal signal will always refer to the signal in the same way, regardless of any parameters used to define the internal signal width, and so the parameter should be marked as DNC.

However, if the signal in question is a port signal (input/output), then the parameter can be treated as DNC only if this port bus is assigned in a uniform way across all bits (e.g., the same clock domain is used) and the same abstraction is generated for all the bits. That is, the parameter can be treated as DNC if the clock domain is consistent across all the bits of the signal because the abstract model will not vary depending on the width parameter. If a bus is 8 bits wide, then all 8 bits should have the same abstract model logic and only then can the parameter be treated as DNC. For example, in the RTL below the data transfer between the busses "in," "tmp," "sync," and "out" takes place consistently across all bits, and so the parameter "size" can be marked as DNC:

```
module top(clk1, clk2, in, out);
parameter size = 8;
input clk1, clk2;
input [size-1:0] in;
output reg [size-1:0]out;
reg [size-1:0]sync;
always @(posedge clk1)
   tmp <= in;
always @(posedge clk2)
   begin
      sync <= tmp;
      out <= sync;
   end
```

If different bits of the parameter "size" were used in different clock domains, then the parameter "size" should not be marked as DNC. In an embodiment, additional CDC verification characteristics can also be used to identify DNC parameters. In an embodiment, a parameter denoting width should only be marked as DNC if the bus bits have uniform CDC verification characteristics, including synchronizer (e.g., synchronizer usage), glitch (e.g., glitch detection), convergence (e.g., convergence verification), quasi_static (e.g., quasi-static signal detection) and constant (e.g., constant verification) behavior. All bits of the parameter should be uniform in these characteristics for the parameter to be marked DNC.

As another example, parameters used in the index of a continuous assignment can be identified as DNC candidates. These parameters should be marked as DNC if all bits are used uniformly in the same clock domain. For example, in the RTL illustrated below the parameter "SIZE" should be marked as DNC if all bits are used in the same clock domain:
assign c[SIZE:0]=a[SIZE:0] & b[ SIZE:0]

As another example, parameters used in width cast (e.g., to truncate a bus) can be identified as DNC candidates. These parameters should be marked as DNC if all bits are used in the same clock domain. For example, in the RTL illustrated below, the parameter "SIZE" should be marked as DNC if all bits are used in the same clock domain:
wire [31:0]y;
assign x=SIZE'(y); //if SIZE=16, then x truncates 16 bits of y These are merely examples, and any suitable categories of parameters can be identified as DNC candidates. Further, additional categories of parameters can be marked as DNC based on clock domain information (e.g., marked as DNC if all bits of the parameter are used in the same clock domain).

Figure 4:
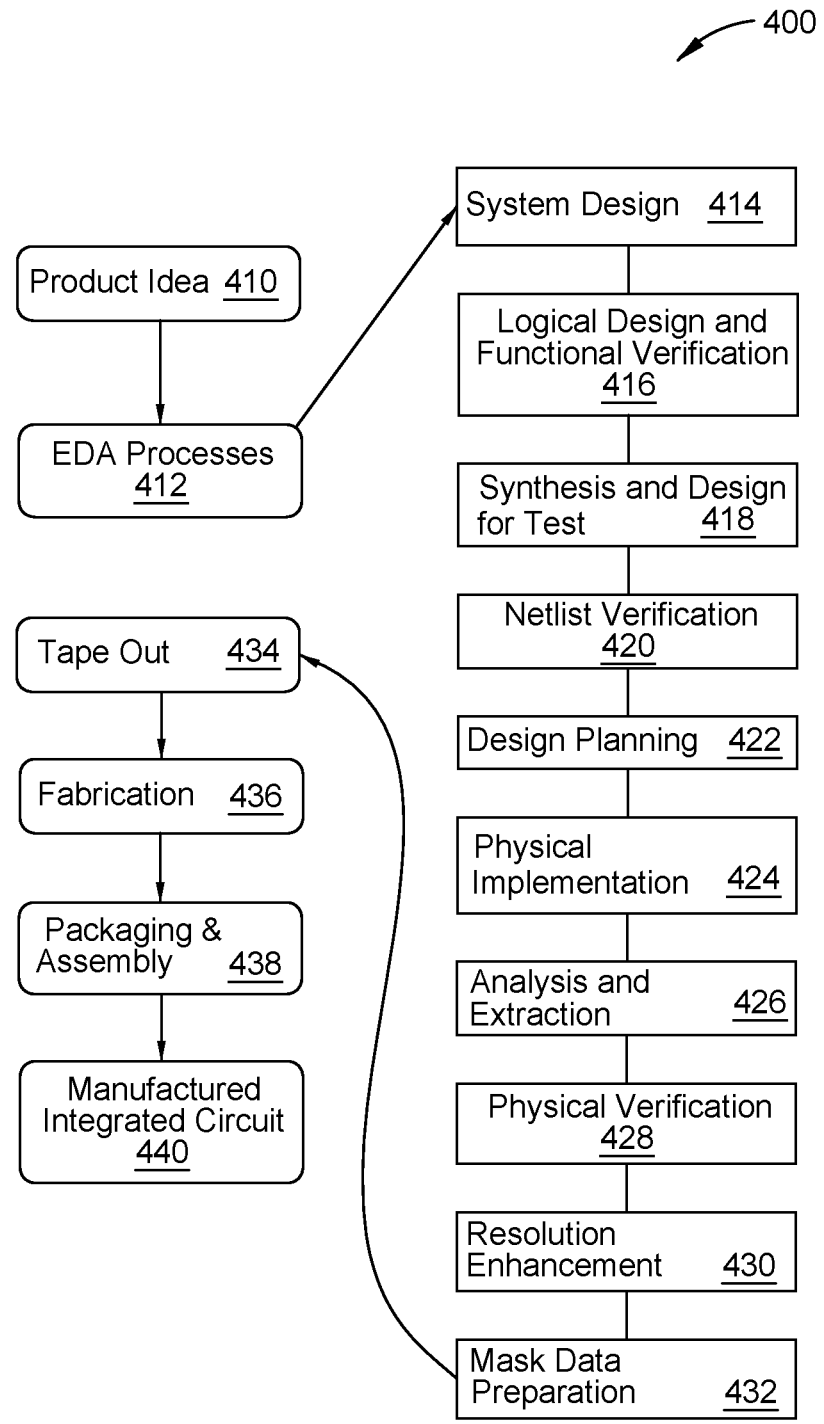
FIG. 4 is a flowchart of various operations in the design and fabrication of an integrated circuit, according to one embodiment.

FIG. 4 is a flowchart of various operations in the design and fabrication of an integrated circuit, according to one embodiment. FIG. 4 illustrates an example set of processes 400 used during the design, verification, and fabrication of an integrated circuit on a semiconductor die to transform and verify design data and instructions that represent the integrated circuit. Each of these processes can be structured and enabled as multiple modules or operations. The term "EDA" signifies Electronic Design Automation. These processes start, at block 410, with the creation of a product idea with information supplied by a designer, information that is transformed to create an integrated circuit that uses a set of EDA processes, at block 412. When the design is finalized, the design is taped-out, at block 434, which is when artwork (e.g., geometric patterns) for the integrated circuit is sent to a fabrication facility to manufacture the mask set, which is then used to manufacture the integrated circuit. After tape-out, at block 436, the integrated circuit is fabricated on a semiconductor die, and at block 438, packaging and assembly processes are performed to produce, at block 440, the finished integrated circuit (oftentimes, also referred to as "chip" or "integrated circuit chip").

Specifications for a circuit or electronic structure may range from low-level transistor material layouts to high-level description languages. A high-level of abstraction may be used to design circuits and systems, using a hardware description language (HDL) such as VHDL, Verilog, SystemVerilog, SystemC, MyHDL or OpenVera. The HDL description can be transformed to a logic-level RTL description, a gate-level description, a layout-level description, or a mask-level description. Each lower abstraction level that is a less abstract description adds more useful detail into the design description, such as, for example, more details for the modules that include the description. The lower levels of abstraction that are less abstract descriptions can be generated by a computer, derived from a design library, or created by another design automation process. An example of a specification language at a lower level of abstraction language for specifying more detailed descriptions is SPICE, which is used for detailed descriptions of circuits with many analog components. Descriptions at each level of abstraction are enabled for use by the corresponding tools of that layer (e.g., a formal verification tool). A design process may use a sequence depicted in FIG. 4. The processes described may be enabled by EDA products (or tools).

During system design, at block 414, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification, at block 416, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some examples, special systems of components, referred to as emulators or prototyping systems, are used to speed up the functional verification. In an embodiment, block 416 includes parameterized CDC verification, as discussed above with regard to FIGS. 1-3. This is merely one example, and CDC verification can be implemented at any suitable part of the design cycle.

During synthesis and design for test, at block 418, HDL code is transformed to a netlist. In some examples, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification, at block 420, the netlist is checked for compliance with timing constraints and for correspondence with the HDL code. During design planning, at block 422, an overall floor plan for the integrated circuit is constructed and analyzed for timing and top-level routing.

During layout or physical implementation, at block 424, physical placement (positioning of circuit components, such as transistors or capacitors) and routing (connection of the circuit components by multiple conductors) occurs, and the selection of cells from a library to enable specific logic functions can be performed. As used herein, the term "cell" may specify a set of transistors, other components, and interconnections that provides a Boolean logic function (e.g., AND, OR, NOT, XOR) or a storage function (such as a flip-flop or latch). As used herein, a circuit "block" may refer to two or more cells. Both a cell and a circuit block can be referred to as a module or component and are enabled as both physical structures and in simulations. Parameters are specified for selected cells (based on standard cells) such as size and made accessible in a database for use by EDA products.

During analysis and extraction, at block 426, the circuit function is verified at the layout level, which permits refinement of the layout design. During physical verification, at block 428, the layout design is checked to ensure that manufacturing constraints are correct, such as design rule check (DRC) constraints, electrical constraints, lithographic constraints, and that circuitry function matches the HDL design specification. During resolution enhancement, at block 430, the geometry of the layout is transformed to improve how the circuit design is manufactured.

During tape-out, data is created to be used (after lithographic enhancements are applied if appropriate) for production of lithography masks. During mask data preparation, at block 432, the tape-out data is used to produce lithography masks that are used to produce finished integrated circuits.

A storage subsystem of a computer system (such as computer system 500 of FIG. 5) may be used to store the programs and data structures that are used by some or all of the EDA products described herein, and products used for development of cells for the library and for physical and logical design that use the library.

Figure 5:
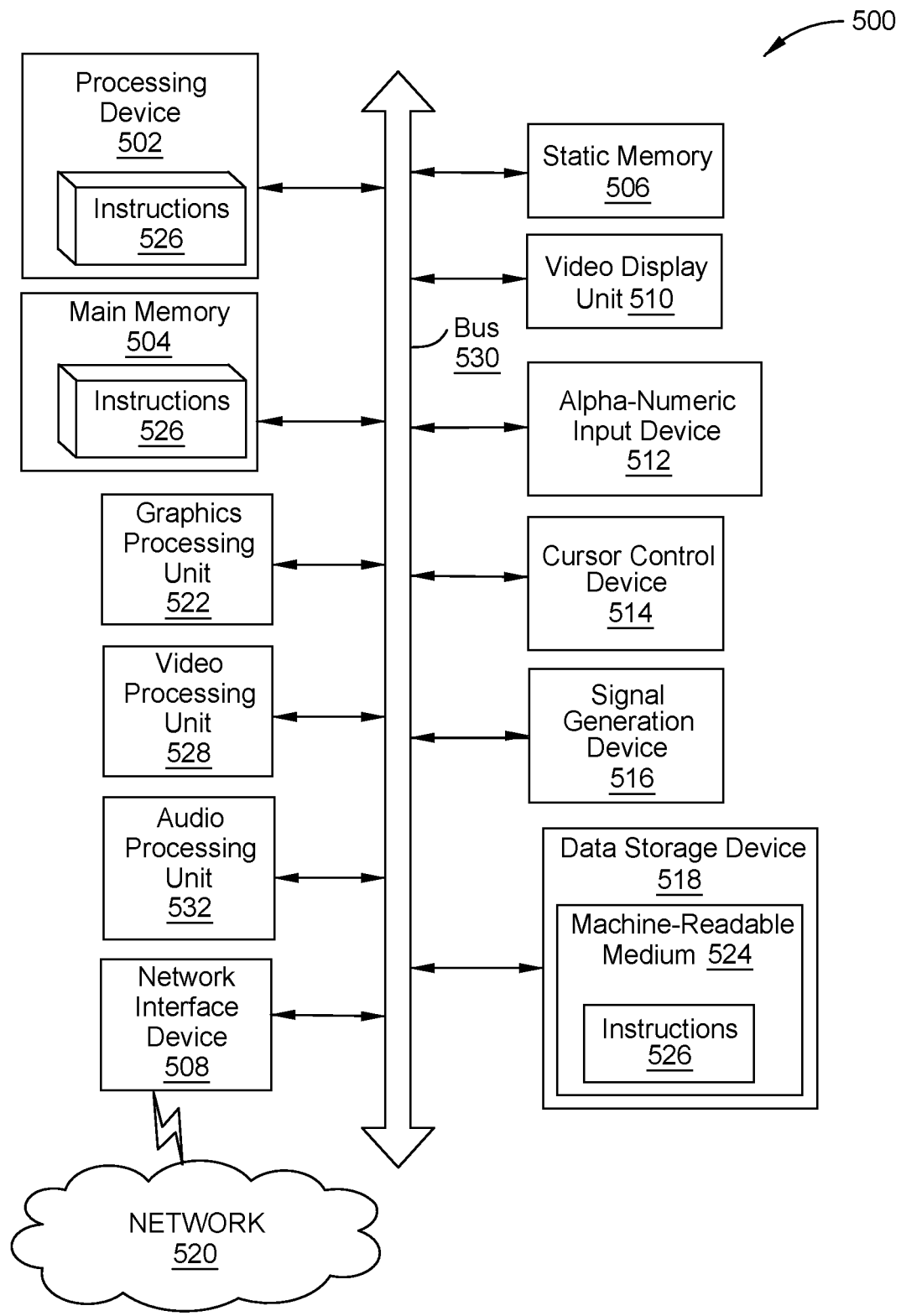
FIG. 5 is a block diagram illustrating an example computer system in which examples of the present disclosure may operate, according to one embodiment.

FIG. 5 is a block diagram illustrating a computer system suitable for use in electronic design of an integrated circuit, according to one embodiment. FIG. 5 illustrates an example of a computer system 500 within which a set of instructions, for causing the computer system to perform any one or more of the methodologies discussed herein, may be executed. In some implementations, the computer system may be connected (e.g., networked) to other machines or computer systems in a local area network (LAN), an intranet, an extranet, and/or the Internet. The computer system may operate in the capacity of a server or a client computer system in client-server network environment, as a peer computer system in a peer-to-peer (or distributed) network environment, or as a server or a client computer system in a cloud computing infrastructure or environment.

The computer system may be a personal computer (PC), a tablet PC, a set-top box (STB), a personal digital assistant (PDA), a cellular telephone, a web appliance, a server, a network router, a switch or bridge, or any machine capable of executing a set of instructions (sequential or otherwise) that specify actions to be taken by that computer system. Further, while a single computer system is illustrated, the term computer system shall also be taken to include any collection of computer systems that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM), a static memory 506 (e.g., flash memory, static random access memory (SRAM), etc.), and a data storage device 518, which communicate with each other via a bus 530. The main memory 504 includes or is a non-transitory computer readable medium. The main memory 504 (e.g., a non-transitory computer readable medium) can store one or more sets of instructions 526, that when executed by the processing device 502, cause the processing device 502 to perform some or all of the operations, steps, methods, and processes described herein.

Processing device 502 represents one or more processors such as a microprocessor, a central processing unit, or the like. More particularly, the processing device 502 may be or include complex instruction set computing (CISC) microprocessor, reduced instruction set computing (RISC) microprocessor, very long instruction word (VLIW) microprocessor, a processor implementing other instruction sets, or processor(s) implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 may be configured to execute instructions 526 for performing some or all of the operations, steps, methods, and processes described herein.

The computer system 500 may further include a network interface device 508 to communicate over the network 520. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), a graphics processing unit 522, a signal generation device 516 (e.g., a speaker), graphics processing unit 522, video processing unit 528, and audio processing unit 532.

The data storage device 518 may include a machine-readable storage medium 524 (e.g., a non-transitory computer-readable medium) on which is stored one or more sets of instructions 526 or software embodying any one or more of the methodologies or functions described herein. The instructions 526 may also reside, completely or at least partially, within the main memory 504 and/or within the processing device 502 during execution thereof by the computer system 500, the main memory 504 and the processing device 502 also including machine-readable storage media.

In some implementations, the instructions 526 include instructions to implement functionality described herein. For example, the instructions 526 can include a CDC verification service used to implement the techniques described in the present disclosure (e.g., in FIGS. 1-4). This is merely one example, and the instructions 526 can include any suitable organization of instructions to implement the disclosed techniques (e.g., more components, fewer components, distributed components, etc.).

While the machine-readable storage medium 524 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the computer system and that cause the computer system and the processing device 502 to perform any one or more of the methodologies described above. The term "machine-readable storage medium" shall accordingly be taken to include, but not be limited to, solid-state memories, optical media, and magnetic media.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the claimed subject matter or as a limitation on the scope of the claimed subject matter. In addition, an illustrated example need not have all the aspects or advantages shown. An aspect or an advantage described in conjunction with a particular example is not necessarily limited to that example and can be practiced in any other examples even if not so illustrated or if not so explicitly described. Further, methods described herein may be described in a particular order of operations, but other methods according to other examples may be implemented in various other orders (e.g., including different serial or parallel performance of various operations) with more or fewer operations.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory (ROM), random access memory (RAM), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

In view of the foregoing, the scope of the present disclosure is determined by the claims that follow.

What is claimed is:

1. A method comprising:
    receiving a register-transfer level (RTL) description of a design relating to an integrated circuit, wherein the design comprises a plurality of clock domains and wherein the RTL description comprises a first parameter with a first plurality of possible values for clock domain crossing (CDC) verification and a second parameter with a second plurality of possible values for CDC verification;
    identifying the first parameter as a do-not-care (DNC) parameter for CDC verification based on clock domain usage of the first parameter in the design; and
    generating, by a processing device, a plurality of models relating to the design, wherein a first value of the first parameter is not varied during the generating based on the identification of the first parameter as a DNC parameter, and wherein a second value of the second parameter is varied during the generating.

2. The method of claim 1 wherein the identifying the first parameter as the DNC parameter is based on the RTL description.

3. The method of claim 2 wherein the first parameter is used, in the RTL, for at least one of: (i) a width parameter, (ii) an index of a continuous assignment, or (iii) a width cast used to truncate a bus.

4. The method of claim 2 wherein the first parameter is used as a width parameter and wherein the identifying the first parameter as the DNC parameter is further based on determining that all bits for the first parameter have uniform characteristics relating to at least one of: (i) synchronizer, (ii) glitch, (iii) convergence, (iv) quasi_static, or (v) constant behavior.

5. The method of claim 2 wherein the first parameter is used, in the RTL, in at least one of: (i) a gate delay, (ii) a timing check, or (iii) an init expression.

6. The method of claim 2 further comprising:
    identifying the second parameter as not a DNC parameter based on the RTL description.

7. The method of claim 6 wherein the second parameter is used in at least one of: (i) an if statement, (ii) a for statement, (iii) a generate statement, (iv) a selective assignment, (v) a multi-concat multiplier statement, (vi) an index, (vii) a part select statement, (viii) a slice size statement, or (ix) right hand side of an init expression.

8. The method of claim 1 further comprising:
    performing CDC verification for the integrated circuit using the plurality of models.

9. The method of claim 1 wherein the identifying the first parameter as the DNC parameter further comprises:
    determining that all bits for the first parameter are used in a same clock domain.

10. A system comprising:
    a processor; and
    a memory storing instructions, which when executed by the processor, cause the processor to perform operations comprising:
        receiving a register-transfer level (RTL) description of a design relating to an integrated circuit, wherein the design comprises a plurality of clock domains and wherein the RTL description comprises a plurality of parameters, including a first parameter with a first plurality of possible values for clock domain crossing (CDC) verification;
        identifying the first parameter as a do-not-care (DNC) parameter for CDC verification based on clock domain usage of the first parameter in the design; and
        generating one or more models relating to the design, wherein a first value of the first parameter is not varied during the generating based on the identification of the first parameter as a DNC parameter.

11. The system of claim 10 wherein the identifying the first parameter as the DNC parameter is based on the RTL description.

12. The system of claim 10 the operation further comprising:
performing CDC verification for the integrated circuit using the plurality of models.

13. The system of claim 10 wherein the identifying the first parameter as the DNC parameter further comprises:
determining that all bits for the first parameter are used in a same clock domain.

14. The system of claim 10 the operation further comprising:
identifying a second parameter, of the plurality of parameters, as not a DNC parameter, based on the design.

15. A non-transitory computer readable medium comprising stored instructions, which when executed by a processor, cause the processor to:
receive a register-transfer level (RTL) description of a design relating to an integrated circuit, wherein the design comprises a plurality of clock domains and wherein the RTL description comprises a first parameter with a first plurality of possible values for clock domain crossing (CDC) verification and a second parameter with a second plurality of possible values for CDC verification;
identify the first parameter as a do-not-care (DNC) parameter for CDC verification, based on clock domain usage of the first parameter in the design;
identify the second parameter as not a DNC parameter for CDC verification based on usage of the second parameter in the design; and
generate a plurality of models relating to the design, wherein a first value of the first parameter is not varied during the generating based on the identification of the first parameter as a DNC parameter and wherein a second value of the second parameter is varied during the generating based on the identification of the second parameter as not a DNC parameter.

16. The non-transitory computer readable medium of claim 15 wherein the identifying the first parameter as the DNC parameter is based on the RTL description.

17. The non-transitory computer readable medium of claim 16 wherein the stored instructions further cause the processor to:
perform CDC verification for the integrated circuit using the plurality of models.

18. The non-transitory computer readable medium of claim 16 wherein the identifying the first parameter as the DNC parameter further comprises:
determining that all bits for the first parameter are used in a same clock domain.

19. The non-transitory computer readable medium of claim 16 wherein the first parameter is used, in the RTL, for at least one of: (i) a width parameter, (ii) an index of a continuous assignment, or (iii) a width cast used to truncate a bus.

* * * * *

UNITED STATES PATENT AND TRADEMARK OFFICE
CERTIFICATE OF CORRECTION

PATENT NO. : 11,087,059 B2  
APPLICATION NO. : 16/906001  
DATED : August 10, 2021  
INVENTOR(S) : Anshu Malani, Paras Mal Jain and Sudeep Mondal Page 1 of 1

It is certified that error appears in the above-identified patent and that said Letters Patent is hereby corrected as shown below:

In the Claims

Column 16, Line 22, delete "claim 16" and insert -- claim 18 --, therefor.

Signed and Sealed this  
Eighth Day of February, 2022

Drew Hirshfeld  
*Performing the Functions and Duties of the  
Under Secretary of Commerce for Intellectual Property and  
Director of the United States Patent and Trademark Office*